Feb. 2, 1926.
M. W. DURGIN
HAY SWEEP
Filed Jan. 16, 1923  2 Sheets-Sheet 1
1,571,398
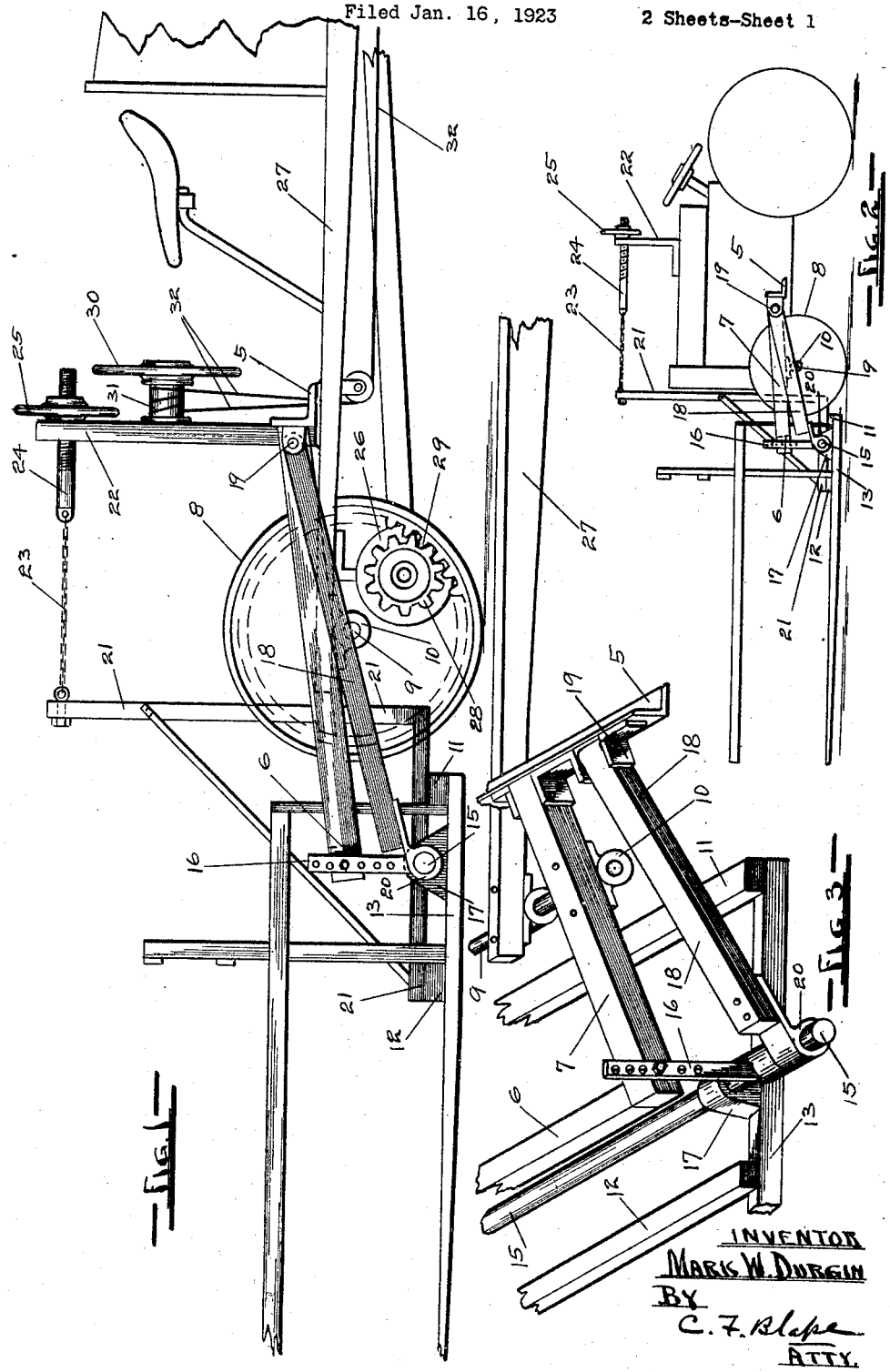
INVENTOR
Mark W. Durgin
BY
C. F. Blake
ATTY.

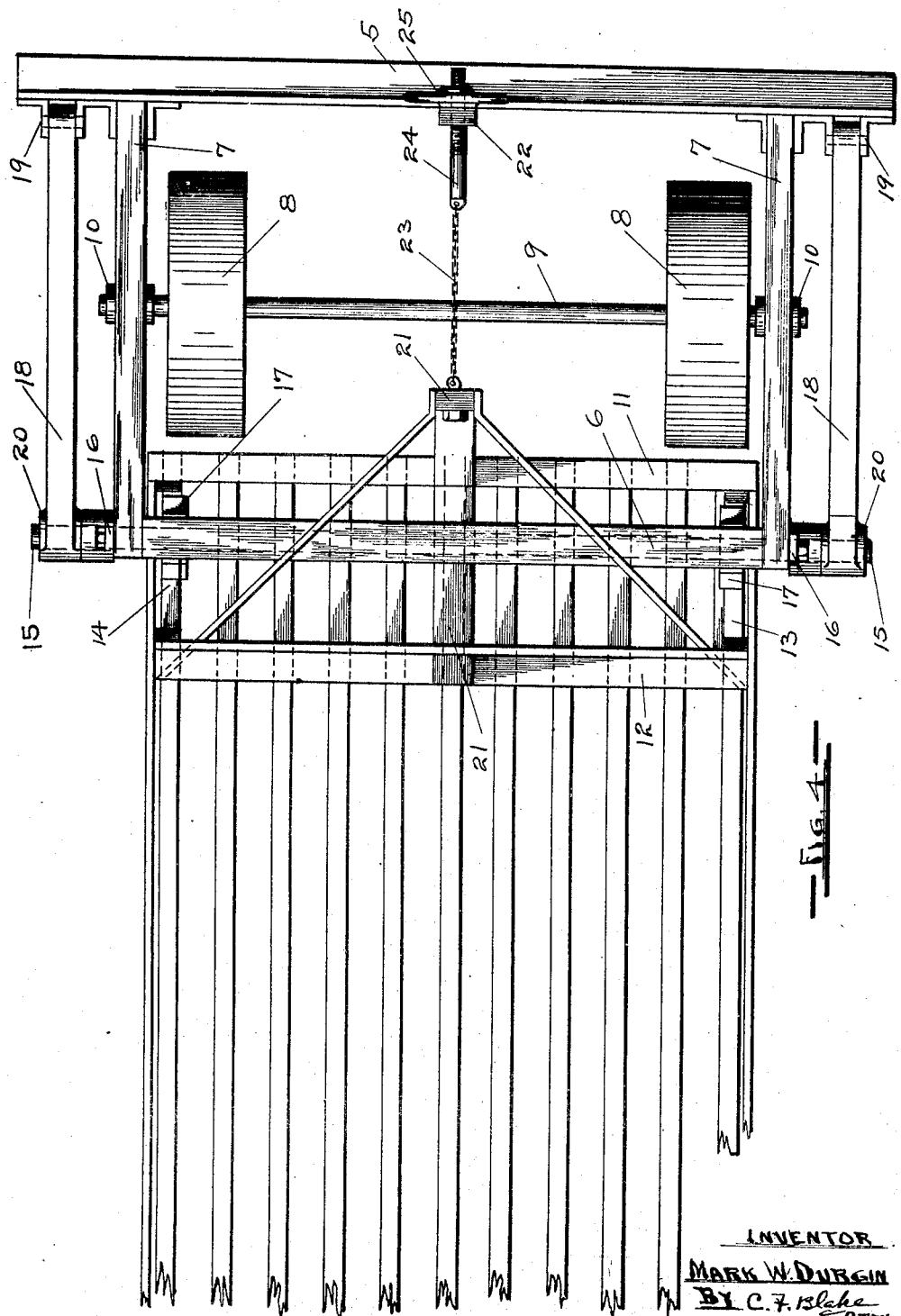

Patented Feb. 2, 1926.

1,571,398

UNITED STATES PATENT OFFICE.

MARK W. DURGIN, OF CORVALLIS, OREGON.

HAY SWEEP.

Application filed January 16, 1923. Serial No. 612,953.

*To all whom it may concern:*

Be it known that I, MARK W. DURGIN, a citizen of the United States, residing at Corvallis, county of Benton, State of Oregon, have invented certain new and useful Improvements in Hay Sweeps, of which the following is a specification.

My invention relates to hay sweeps in general, and particularly to such hay sweeps as are adapted for attachment to vehicles such as tractors and the like, the object being to provide such a sweep of very simple form, easly mounted upon such vehicle, and having easily controlled oscillating movement and vertical adjustment, and a novel form of drive.

I accomplish these objects by means of the construction illustrated in the accompanying drawings, which are a part of this application for Letters Patent, like characters of reference indicating like parts throughout the several views thereof, and in which:

Fig. 1 is a side elevation of my device attached to an automobile chassis.

Fig. 2 is a similar view with my device attached to a tractor.

Fig. 3 is a fragmentary perspective view of the frame members of my device.

Fig. 4 is a plan view of my device.

In general my device consists of a rectangular frame adapted to be mounted upon a vehicle, a rectangular frame upon which are mounted the sweep teeth, a vertically adjustable connection between said frames, and radius rods or pivotally mounted driving members between said frames.

The vehicle mounted frame consists of a rear member 5, a front member 6, and side or end members 7, said members being so joined as to constitute a rigid rectangular frame, which frame may be mounted upon any convenient and suitable vehicle in any convenient manner. Said frame is supported by wheels 8 and axle 9, which axle is mounted within suitable journal boxes 10 upon the end members 7.

The tooth frame is constructed of two parallel transverse members 11 and 12, and end members 13 and 14, the latter members being forwardly extended to form the two outer sweep teeth. The intermediate sweep teeth are secured to the members 11 and 12 at suitably spaced points, and extend forwardly parallel one to the other, and substantially parallel to the ground, as is usual with hay sweeps.

To mount the tooth frame upon the vehicle mounted frame I provide a shaft 15 suspended from the forward end of the latter frame by vertically adjustable hangers 16, said shaft being mounted within suitable journal boxes 17 attached to the members 13 and 14 respectively of the tooth frame. It is evident that this construction provides that the tooth frame and the teeth mounted thereupon shall be oscillatable upon the shaft 15.

As the vehicle mounted frame is propelled by the vehicle, the tooth frame is in turn propelled from the former frame, and it is evident that the hangers 16 are not suitable propulsion members, therefore I provide such members in the form of radius rods or pivotally mounted struts 18, said struts being pivotally mounted upon the vehicle mounted frame at 19 and pivotally connected to the shaft 15 by end pieces 20.

To oscillate the tooth frame upon the shaft 15 I provide an angle member 21, the horizontal leg of which is secured to the members 11 and 12 and extends rearward therefrom, and the vertical leg of which projects upward from the rearward end of said horizontal leg. I also provide a vertical member 22 adjacent the driver's seat, and connect the upper ends of the members 21 and 22 by a flexible member 23 terminating in a screw 24 and a threaded hand wheel 25 thereupon adjacent the member 22. The operation of the hand wheel 25 will cause the tooth frame to oscillate upon the shaft 15 and thus tilt the teeth, raising or lowering the forward ends thereof.

My device is adapted primarily for use with an automobile chassis. To accommodate such a chassis to my device I turn the rear axle and housing 26 of Fig. 1 end for end, which reverses the relation of the transmission pinion and gear, and results in the chassis running backwards when the engine is running with the transmission direct connected. I then mount the rear end of the chassis frame 27 upon the shaft 9 having first removed the rear wheels of the automobile, and replaced them with pinions 28 to mesh with gears 29 attached to the wheels 8, as shown in Fig. 1. A steering wheel 30 and drum 31 is mounted upon the vertical member 22 and is connected by cables 32 to the steering apparatus of the chassis.

The mounting of my device upon a tractor is practically the same as the above except that the wheels 8 are the regular tractor wheels, and that the frame member 5 is divided in the center and attached to the tractor body, and also the member 21 arched to clear the tractor radiator. Various minor changes in details may be made in my device to adapt the same for use with various makes and designs of vehicles.

My device may be made of any size, and constructed of any materials deemed convenient and suitable for a device of this character, and while I have illustrated and described a form of construction and arrangement of parts found desirable in materializing my invention I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a hay sweep to be mounted upon a vehicle: a frame; bearing boxes to mount said frame upon the axle of said vehicle; vertical hangers upon the forward end of said frame; a shaft journaled in said hangers; radius rods connecting said shaft with the rearward member of said frame; a second frame supported upon said shaft; and rake teeth upon said second frame.

2. In a hay sweep to be mounted upon a vehicle: a toothed frame; a rectangular frame; vertical hangers supporting said toothed frame from said rectangular frame; radius rods pivotally connecting said frames; and means for mounting said rectangular frame upon said vehicle.

3. In a hay sweep to be mounted upon a vehicle: a pair of frames; vertically adjustable hangers supporting one of said frames from the other of said frames; pivotally mounted radius rods connecting said frames; teeth upon the lower of said frames; and journals upon the upper of said frames to mount the same upon the axle of said vehicle.

In witness whereof I claim the foregoing as my own I hereunto affix my signature at Portland, county of Multnomah, State of Oregon, this 10th day of Jan. 1923.

MARK W. DURGIN.